(12) United States Patent
Marinescu et al.

(10) Patent No.: US 11,217,116 B2
(45) Date of Patent: Jan. 4, 2022

(54) INTERACTIVE TRAINING FOR APPLICATION PROVIDERS

(71) Applicant: INTERNATIONAL BUSINESS MACHINES CORPORATION, Armonk, NY (US)

(72) Inventors: Radu Marinescu, Dublin (IE); Alice-Maria Marascu, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 719 days.

(21) Appl. No.: 15/938,197

(22) Filed: Mar. 28, 2018

(65) Prior Publication Data

US 2019/0304335 A1 Oct. 3, 2019

(51) Int. Cl.
| | |
|---|---|
| *G09B 19/00* | (2006.01) |
| *G09B 5/00* | (2006.01) |
| *G10L 15/26* | (2006.01) |
| *G09B 7/00* | (2006.01) |

(52) U.S. Cl.
CPC .......... *G09B 19/0053* (2013.01); *G09B 5/00* (2013.01); *G09B 7/00* (2013.01); *G10L 15/26* (2013.01)

(58) Field of Classification Search
CPC ... G09B 19/0053; G06F 11/3664; G06F 3/00; G06F 13/00; G06F 9/44; G06F 9/46; G06F 9/45
See application file for complete search history.

(56) References Cited

U.S. PATENT DOCUMENTS

| | | | |
|---|---|---|---|
| 9,092,276 B2* | 7/2015 | Allen | G06F 9/466 |
| 2003/0226131 A1* | 12/2003 | Li | G06F 8/33 |
| | | | 717/110 |
| 2008/0046860 A1* | 2/2008 | Kratschmer | G06F 11/008 |
| | | | 717/101 |
| 2014/0113257 A1* | 4/2014 | Spiridonov | G09B 19/00 |
| | | | 434/118 |
| 2016/0179506 A1 | 6/2016 | Herbert | |
| 2017/0221165 A1 | 8/2017 | Sawant et al. | |
| 2018/0240356 A1* | 8/2018 | Singh | G09B 7/02 |

FOREIGN PATENT DOCUMENTS

WO     2016077862 A1     5/2016

\* cited by examiner

*Primary Examiner* — Robert J Utama
(74) *Attorney, Agent, or Firm* — Griffiths & Seaton PLLC

(57) ABSTRACT

A system and method for interactive training for application providers in a computing environment are presented. A proposed application solution from a user for a selected application may be compared to one or more optimized solutions to identify one or more differences in the proposed application solution. One or more missing assets may be identified from the proposed application solution according to the one or more differences. The user may be surveyed with a survey relating to the missing assets such that survey results are used to train and develop a level of expertise for the user.

18 Claims, 10 Drawing Sheets

INTERACTIVE TRAINING FOR APPLICATION PROVIDERS

BACKGROUND OF THE INVENTION

Field of the Invention

The present invention relates in general to computing systems, and more particularly to, various embodiments for automated and interactive training for application providers in a computing environment by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. For example, processing devices, with the advent and further miniaturization of integrated circuits, have made it possible to be integrated into a wide variety of applications and devices for personal, business, health, home, education, scientific, or governmental related areas of interest. However, as software developers of these computing applications and devices strive to provide ever more versatile and powerful products, the task of becoming proficient in the implementation and development of such products becomes increasingly difficult. Even for some experienced software developers who consider themselves computer "experts," additional training and education may be required before the software developer provides the full advantage of functional capabilities intended to be offered by many software products.

SUMMARY OF THE INVENTION

Various embodiments for interactive training for application providers in a computing environment using one or more processors are provided. In one embodiment, by way of example only, a method for interactive training for application providers in a computing environment, again by a processor, is provided. A proposed application solution from a user for a selected application may be compared to one or more optimized solutions to identify one or more differences in the proposed application solution. One or more missing assets may be identified from the proposed application solution according to the one or more differences. The user may be surveyed with a survey relating to the missing assets such that the survey results are used to train and develop a level of expertise for the user.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
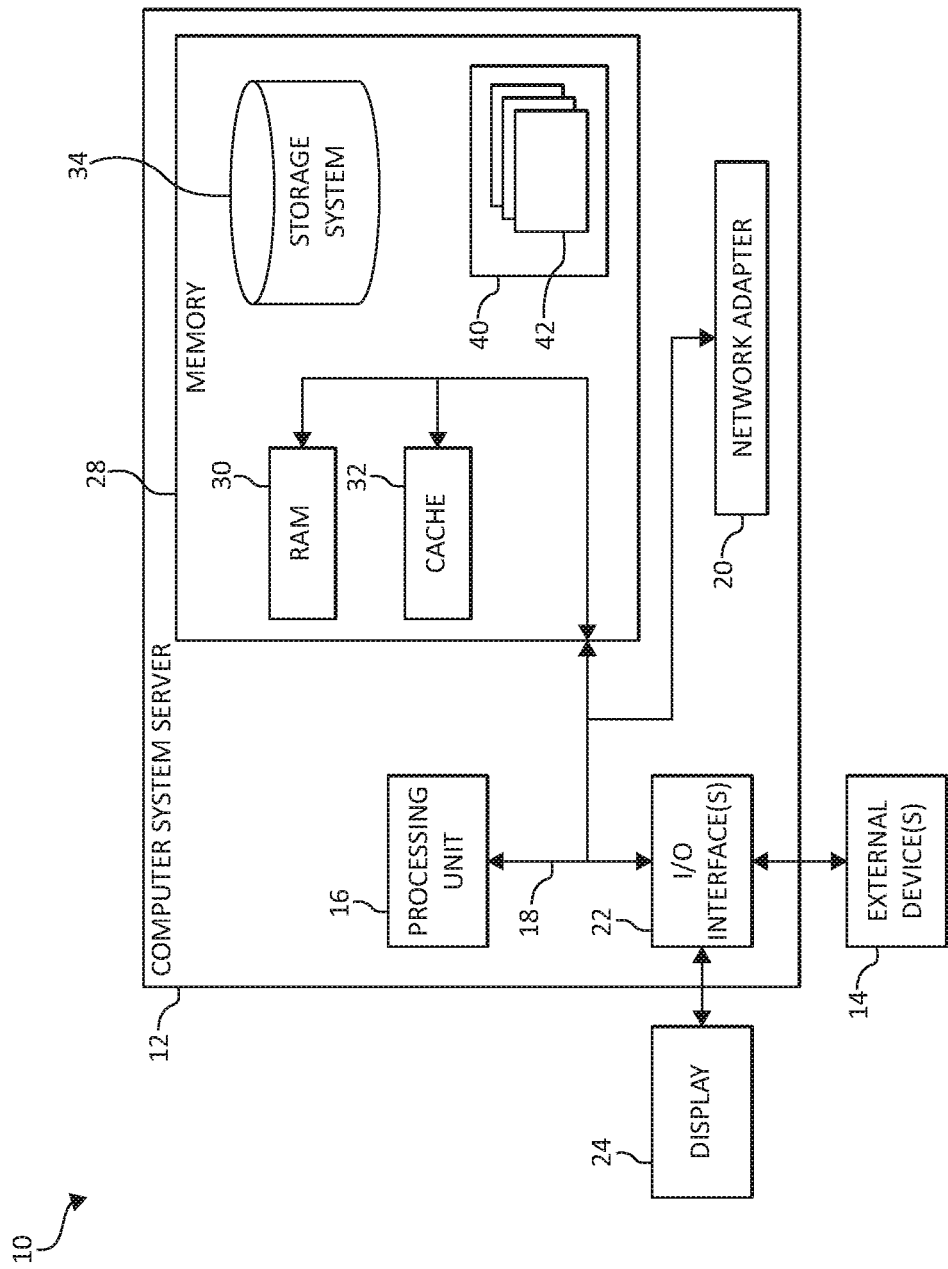
FIG. 1 is a block diagram depicting an exemplary computing node according to an embodiment of the present invention.

Current application development systems rely heavily on human involvement, especially during early phases of application development. Humans (e.g., application developers or "software developers") are needed to understand the problem description the application is asked to solve and, further, to manually design and create the desired application. This can create a bottleneck in application development, as well as suboptimal results, given the large number of applications desired in modern society and the numerous potential combinations for each application.

Moreover, in today's environment, the demand for new applications is increasing while the time to deliver these new applications is decreasing. This causes the development and work of application developers or consultants to become more challenging especially with the increase of assets, various markets, and technological advancements. These application developers must be adept at learning new asset features and functionalities, which is a particular challenge for more inexperienced application developers. Thus, a need exists to provide automatic and interactive training for application developers.

Accordingly, various embodiments are provided herein for automatic and interactive training for application providers in a computing environment. A proposed application solution from a user for a selected application may be compared to one or more optimized solutions to identify one or more differences in the proposed application solution. One or more missing assets may be identified from the proposed application solution according to the one or more differences. The user may be surveyed with a survey relating to the missing assets such that survey results are used to train and develop a level of expertise for the user.

In one aspect, the present invention provides for monitoring a user-provided application solution by an application developer for a selected application. One or more potential "optimal" application solutions may be computed and/or determined. A quality of the user-provided application solution may be computed and/or determined based on a comparison with the one or more optimal application solutions. A knowledge may be deduced as to what assets are missing from the user-provided application solution causing the user-provided application solution to be sub-optimal as compared to the one or more optimal application solutions. An interactive dialog operation may be automatically initiated for conducting a survey and/or interactive dialog with the application developer to examine and determine whether the application developer has a level of skill, experience, expertise, training, and/or education pertaining to the missing assets.

An asset may be a basic asset, such as an action (e.g., data visualization and confirmation or document classification), a service (e.g., a web service), or an application programming interface (an API, e.g., an email API or a speech-to-text API). In some embodiments, an asset may be a complex asset, made up of two or more basic assets. Assets may be found in an internal repository which may be stored, for example, in the memory of the computer system. Assets may be found in an external repository with which the processor communicates. The external repository may be stored, for example, in a cloud storage.

In one aspect, the one or more "optimal" application solutions may be determined by one or more domain experts, asset or application consultants, a pool of training data, educational data used for one or more applications, application providers, or a combination thereof. The present invention may also be provided by an external system which provides for an automated application composition according to a natural language input. The natural language input may be in the form of a problem description or may be a description of the desired functionality of the final application. The natural language input contains one or more application requirements, extracted by parsing the input into one or more chunks. Each chunk is a portion of the natural language input representing an application requirement. A coarse architecture is inferred by analyzing one or more main functionalities required by the application to be composed. The main functionalities may be determined according to the one or more application requirements. The coarse architecture may comprise a data flow determined according to the one or more chunks, such as by semantic matching with the natural language input. Existing assets are identified, each asset corresponding to one or more of the one or more main functionalities required by the application requirements. The identified assets are assembled according to the coarse architecture and the assembled assets are deployed as an application.

It should be noted, as a preliminary matter, that one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
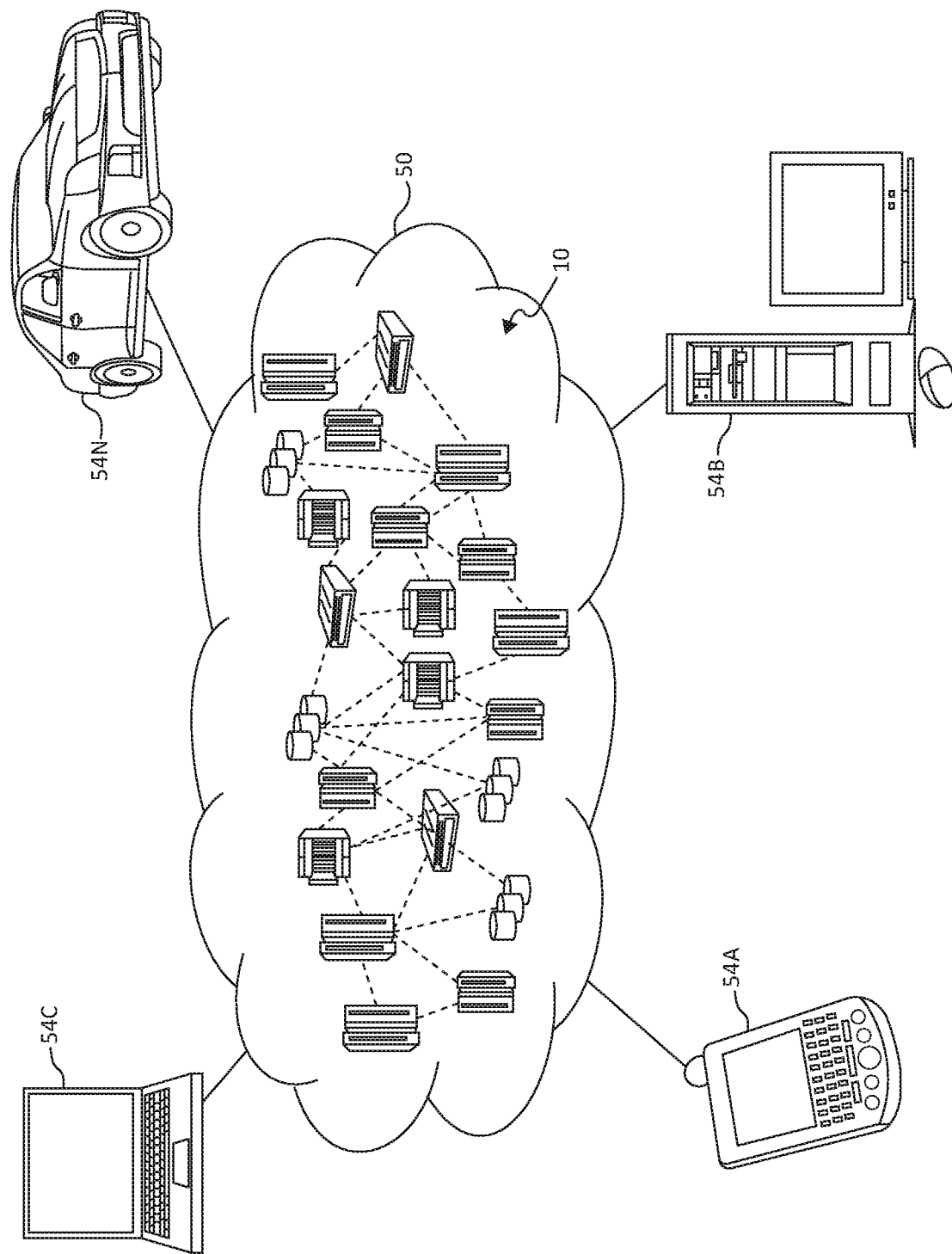
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
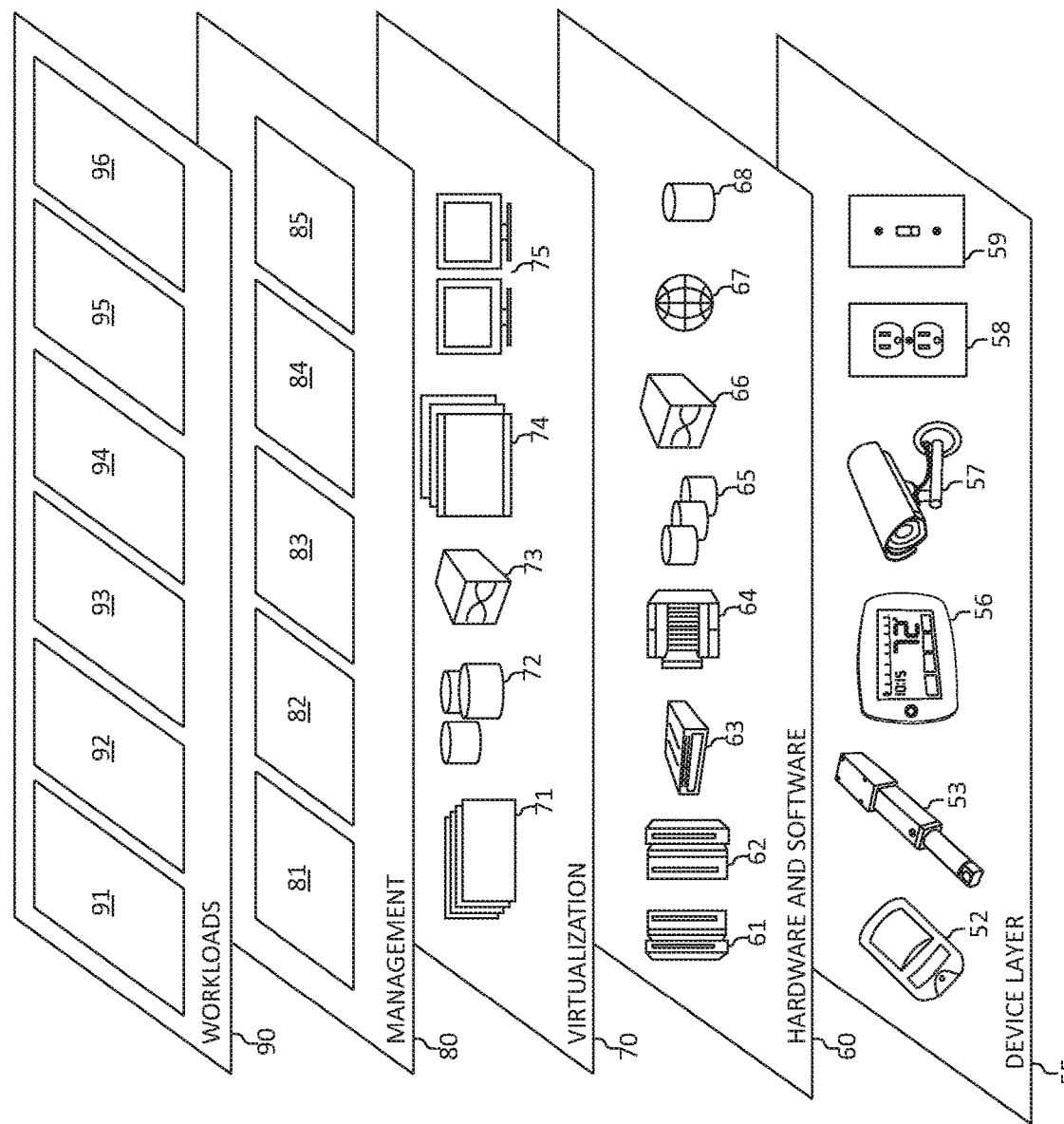
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for automated and interactive training for application providers. In addition, workloads and functions 96 for automated and interactive training for application providers may include such operations as data analytics, data analysis, and as will be further described, notification functionality. One of ordinary skill in the art will appreciate that the workloads and functions 96 for automated and interactive training for application providers may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

In one aspect, the mechanisms of the illustrated embodiments provide a novel approach for automated and interactive training for application providers by computing the differences between a user's proposed solution and a set of optimum solutions. Text functionalities of differentiating assets may be collected. The collected information may be passed to an automated survey generation component where the survey result may be used to train and assess the user's new level of knowledge and/or expertise.

Figure 4A:
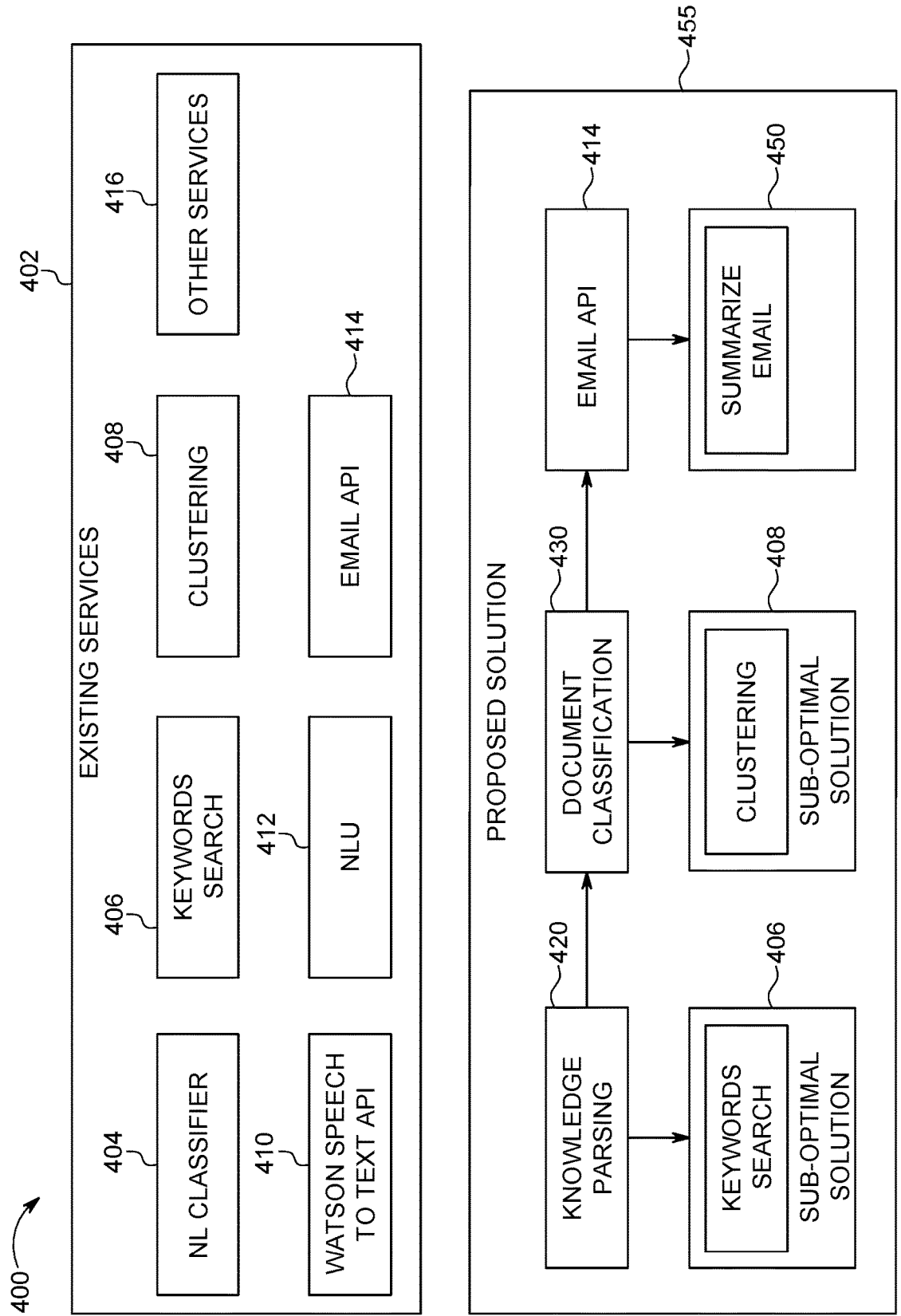
FIG. 4A-4C are block diagrams depicting a proposed application solution from a user compared to one or more optimized solutions according to various aspects of the present invention.
Figure 4B:
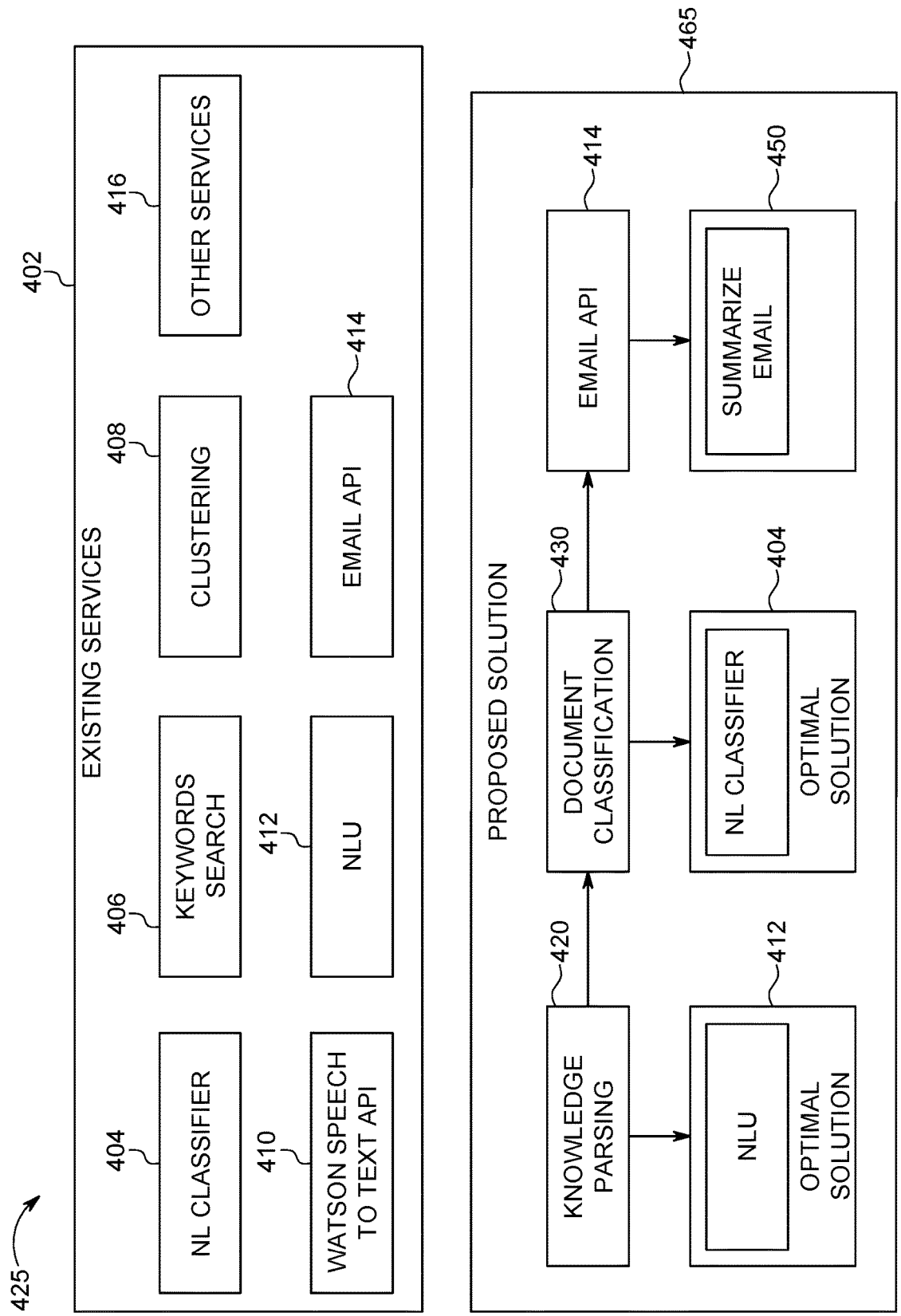

Turning now to FIGS. 4A-4B are block diagrams depicting a proposed application solution from a user compared to one or more optimized solutions. As will be seen, many of the functional blocks may also be considered "modules" of functionality, in the same descriptive sense as has been previously described in FIGS. 1-3. Many of the functional blocks 400 may execute as background processes on various components, either in distributed computing components, or on the user device, or elsewhere, and generally unaware to the user performing generalized tasks of the present invention. Also, one or more aspects of FIGS. 1-3 may also be included with and/or implemented with FIG. 4.

As depicted in both FIGS. 4A-4B are block diagrams 400, 425 that illustrate one or more existing services (or assets)

that may be provided to a user. For example, the existing services 402 available for an application developer may include a natural language ("NL") classifier 404, a speech to text application programming interface ("API") 410 (e.g., IBM® Watson® speech to text API), a keywords search 406, natural language understanding ("NLU") 412, clustering 408, an email API 414, and/or other services 416 that may be available for use.

As depicted in FIG. 4A, a user (e.g., application developer) may use an input to define or describe the problem or desire for a new application. For example, the input may read in natural language "we want a new application that takes as input conversations for a service hotline and reports if they were dealing with software or hardware issues." As such, a user-proposed application solution 455 ("proposed solution" 455) provides for the operations of knowledge parsing 420 using a keywords search 406 (which is deemed as sub-optimal), document classification 430 using clustering 408 (which is deemed as sub-optimal), and email API 414 which summarizes emails 450.

In contrast, as illustrated in FIG. 4B, one or more proposed optimal solutions 465 is depicted. The optimal solutions 465 provide for the operations of knowledge parsing 420 using an NLU 412 (which is determined as an optimal solution), document classification 430 using NL classifier 404 (which is determined as an optimal solution), and email API 414 which summarizes emails 450.

Figure 4C:
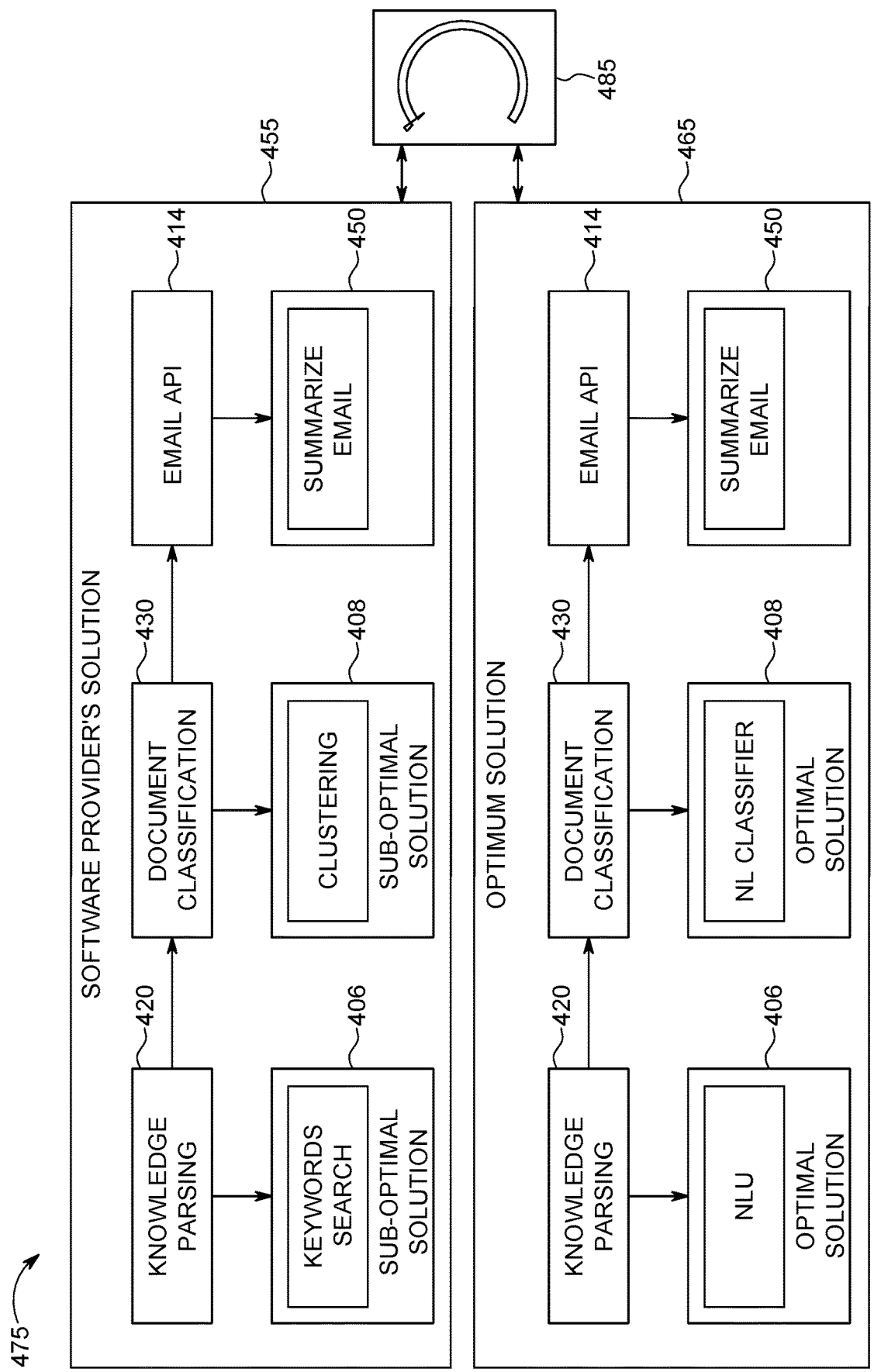

Using the user-proposed application solution 455 and the one or more proposed optimal solutions 465, FIG. 4C depicts the comparison of the user-proposed application solution 455 and the one or more proposed optimal solutions 465 and initiation of an interactive dialog. 485. The interactive dialog 485 may be used to survey a user (e.g., an application developer) with a survey relating to the missing assets (e.g., NLU or NL classifier) such that survey results are used to train and develop a level of expertise for the user.

Figure 5:
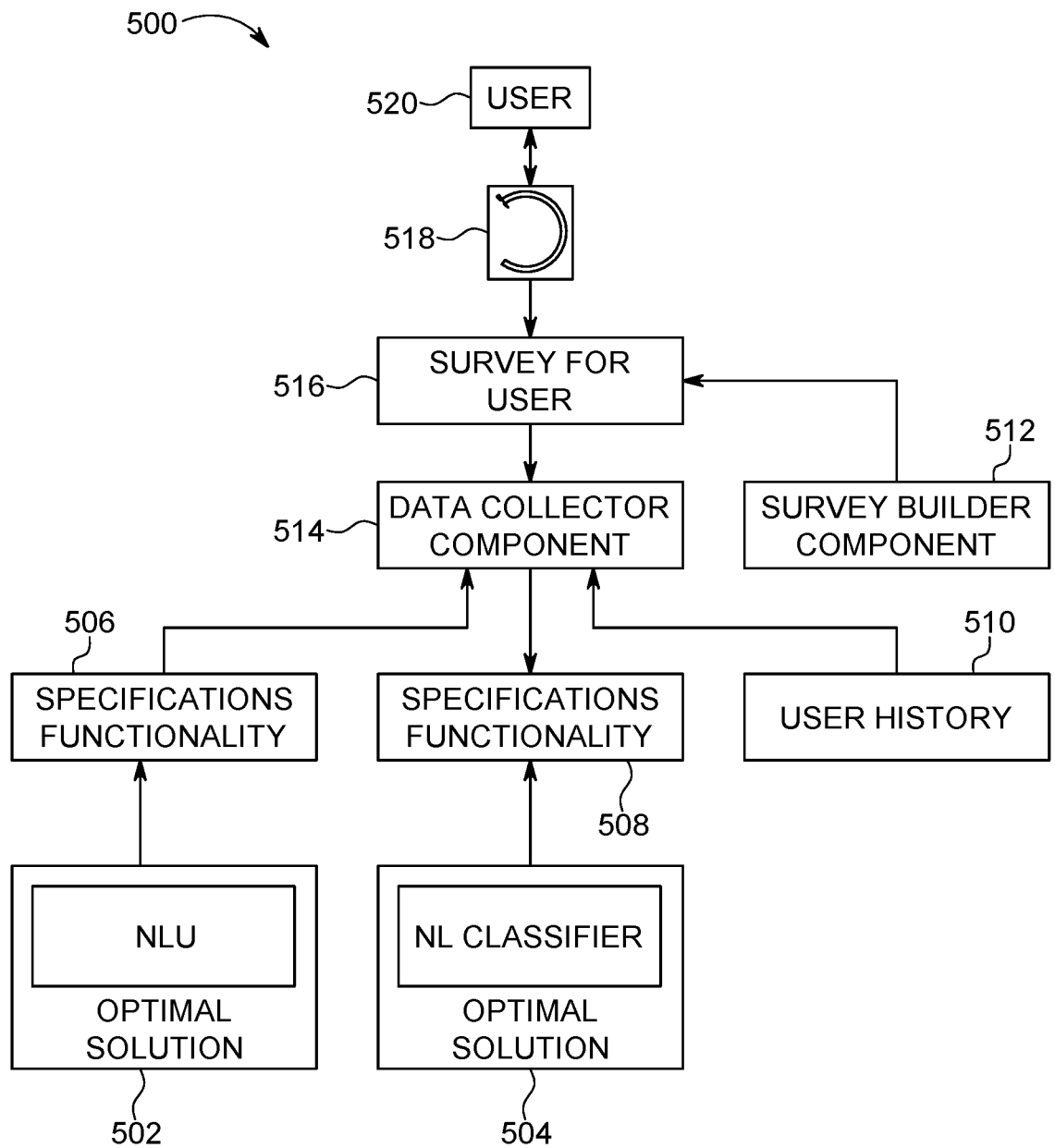
FIG. 5 is an additional block diagram depicting an exemplary functional relationship between various aspects of the present invention.

Turning now to FIG. 5, a block diagram of exemplary functionality 500 relating to automated and interactive training for application providers is depicted. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-4A-C. With the foregoing in mind, the module blocks 500 may also be incorporated into various hardware and software components of a system for automated and interactive training for application providers in accordance with the present invention. Many of the functional blocks 500 may execute as background processes on various components, either in distributed computing components, or on the user device, or elsewhere, and generally unaware to the user.

Once one or more optimal solutions are determined or computed (for the given problem or input), a user-proposed application solution may be compared with one or more optimal application solutions and one or more missing assets may be identified such as, for example, NLU 502 (an optimal solution) and NL classifier 504 (an optimal solution) which the user may not have selected but may select to optimize the user-proposed application solution. One or more specification functions 506, 508 along with a user history 510 (e.g., historical application development behavior) may be used by a data collector component 514 to collect data (e.g., text functionalities) of differentiating assets. A survey builder component 512 may be used to prepare a survey for the user using the collected information from the data collector component 514. At block 516, the user 520 may be surveyed via an interactive dialog 518 with a survey relating to the missing assets such that survey results are used to train and develop a level of expertise for the user and even assess the user's new level of knowledge or expertise.

Figure 6:
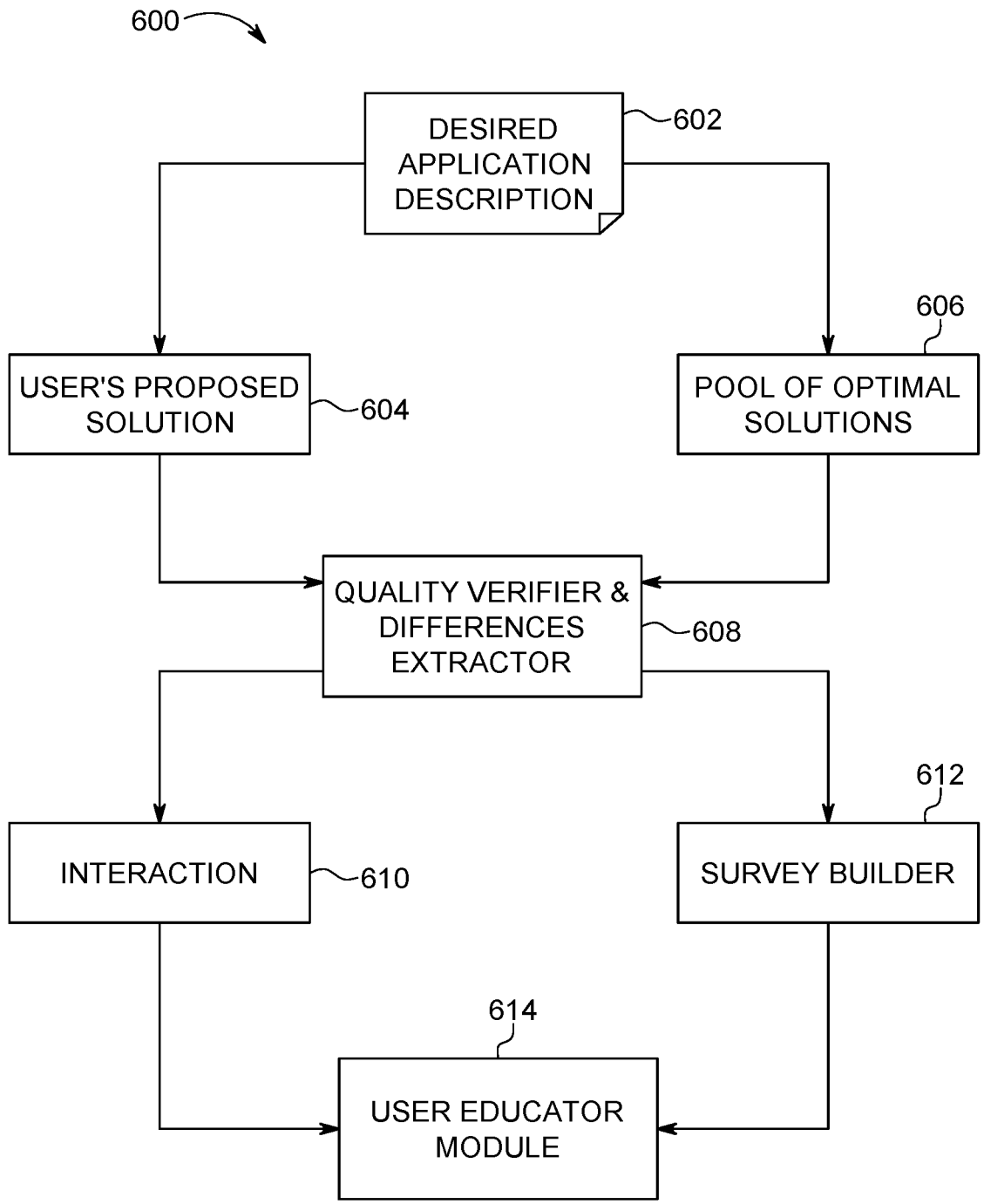
FIG. 6 is an additional flowchart diagram depicting an exemplary method for automated and interactive training for application providers in a computing environment by a processor, again in which aspects of the present invention may be realized.

Turning now to FIG. 6, a method 600 for automated and interactive training for application providers in a computing environment using a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. In one aspect, the functionality, operations, and/or architectural designs of FIGS. 1-5 may be implemented all and/or in part in FIG. 6.

The functionality 600 may start in block 602 with a selected (e.g., desired) application description being defined, received, or provided. Using the selected application description from block 602, a user-proposed application solution (e.g., user's proposed application solution) for the selected application description may be determined (or received from a user), as in block 604. One or more optimized solutions for the selected application description may be computed and/or determined, as in block 606. A level of quality (e.g., quality verifier) may be determined for the user-proposed application solution and the one or more optimized solutions and the user-proposed application solution and the one or more optimized solutions may be compared to identify one or more differences (e.g., extract differences) in the proposed application solution, as in block 608. A knowledge may be deduced as to what, if any, assets are missing from the user-proposed application solutions. That is, missing assets from the proposed application solution may be identified (e.g., differences may be extracted) according to the one or more differences. At blocks 610 and 612, an interactive dialog may be engaged to interact with the user while at the same time a survey is built from a survey builder (according to the level of quality and identified or extracted differences). A user may be trained, educated, or consulted using the survey and the interactive dialog so as to develop a level of expertise for the user, as in block 614. The functionality 600 may also end in block 614.

Figure 7:
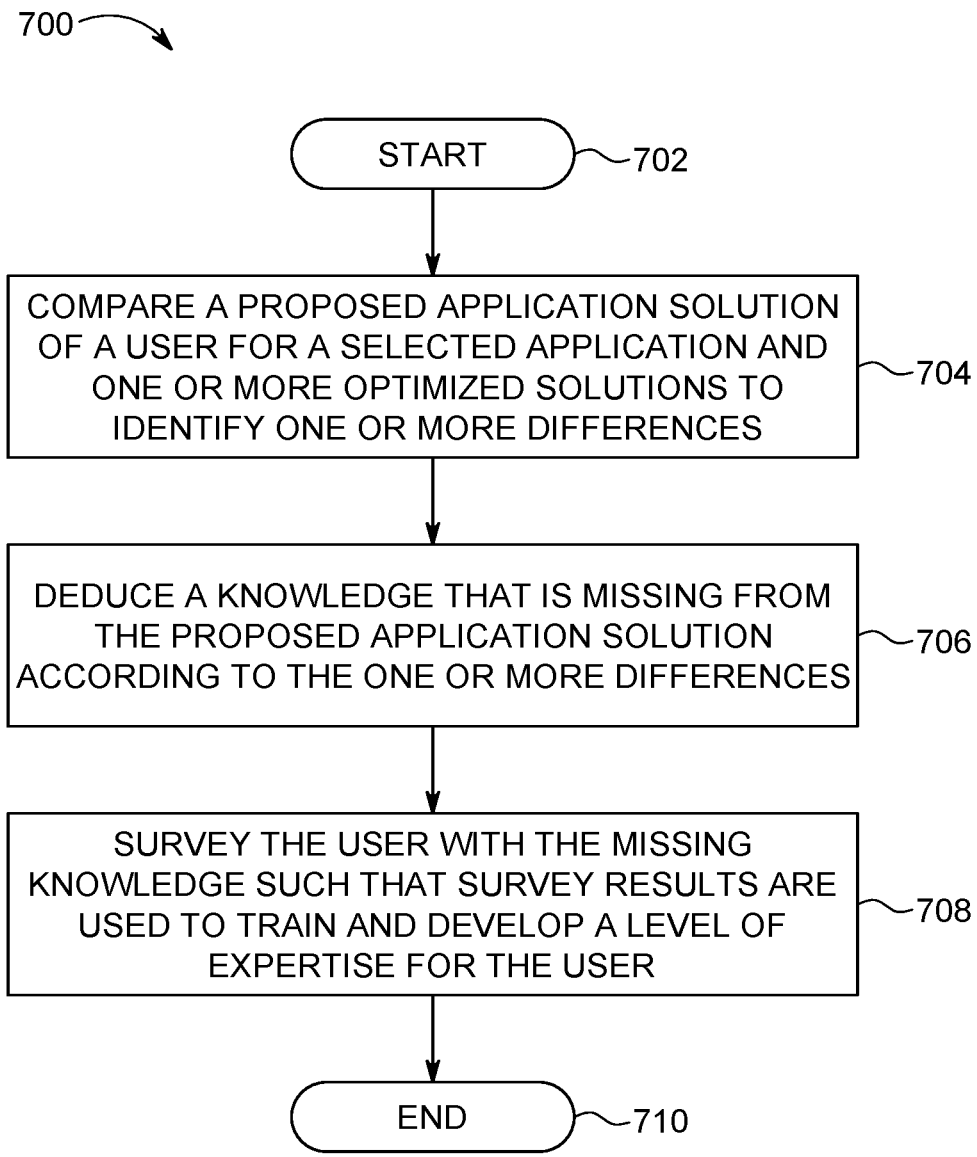
FIG. 7 is an additional flowchart diagram depicting an additional exemplary method for automated and interactive training for application providers in a computing environment by a processor, again in which aspects of the present invention may be realized.

Turning now to FIG. 7, a method 700 for interactive training for application providers in a computing environment using a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. In one aspect, the functionality, operations, and/or architectural designs of FIGS. 1-6 may be implemented all and/or in part in FIG. 7.

The functionality 700 may start in block 702. A proposed application solution from a user for a selected application may be compared to one or more optimized solutions to identify one or more differences in the proposed application solution, as in block 704. One or more missing assets may be identified from the proposed application solution according to the one or more differences, as in block 706. The user may be surveyed with a survey relating to the missing assets such that survey results are used to train and develop a level of expertise for the user, as in block 708. The functionality 700 may end, as in block 710.

Figure 8:
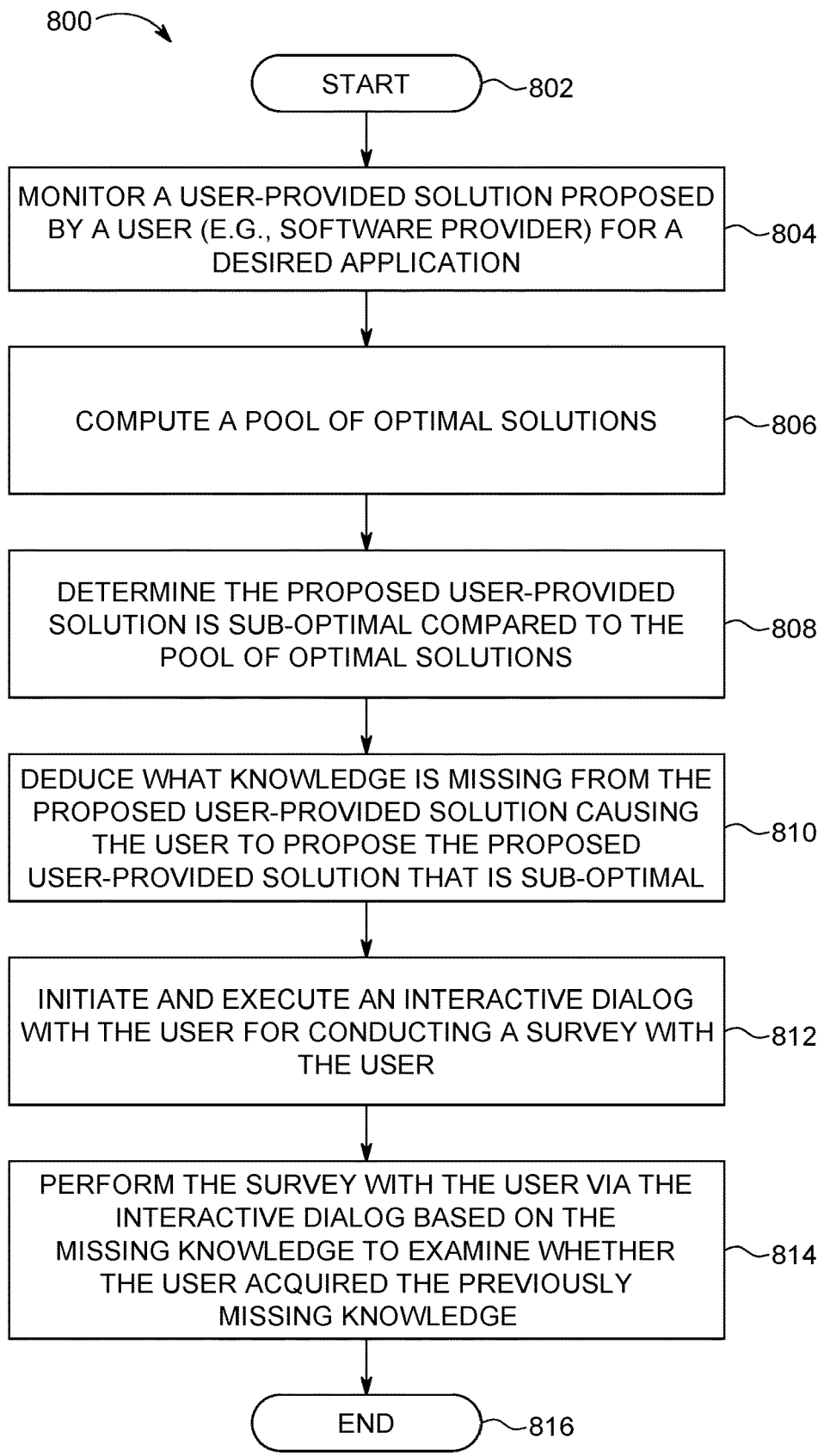
FIG. 8 is an additional flowchart diagram depicting an additional exemplary method for automated and interactive training for application providers in a computing environment by a processor, again in which aspects of the present invention may be realized.

Turning now to FIG. 8, a method 800 for interactive training for application providers in a computing environment using a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. In one aspect, the functionality, operations, and/or architectural designs of FIGS. 1-7 may be implemented all and/or in part in FIG. 8.

The functionality 800 may start in block 802. A user-provided solution proposed by a user (e.g., software provider) may be monitored for a desired application, as in block 804. A pool of optimal solutions may be computed (or determined), as in block 806. The proposed user-provided solution may be determined to be sub-optimal as compared to the pool of optimal solutions, as in block 808. Knowledge missing from the proposed user-provided solution causing the user to propose the proposed user-provided solution that is sub-optimal may be deduced, as in block 810. An interactive dialog may be initiated with the user for conducting a survey with the user, as in block 812. A survey may be performed with the user via the interactive dialog based on the missing knowledge to examine whether the user acquired the previously missing knowledge, as in block 814. The functionality 800 may end, as in block 816.

In one aspect, in conjunction with and/or as part of at least one block of FIGS. 6-8, the operations of methods 600, 700, and/or 800 may include each of the following. The operations of methods 600, 700, and/or 800 may determine and/or compute (or obtain) one or more optimized solutions from one or more domain experts, asset or application consultants, training and educational data used for one or more applications, application providers, or a combination thereof. The operations of methods 600, 700, and/or 800 may determine a level of quality of the proposed application solution as compared to the one or more optimized solutions. The proposed application solution may be determined to be sub-optimal based on the missing assets as compared to the one or more optimized solutions.

The operations of methods 600, 700, and/or 800 may initiate an interactive dialog with the user to perform the survey, determine from the user a level of experience, education, training, expertise, or a combination thereof relating to the missing assets from the proposed application solution, and/or provide to the user the survey results that identify one or more assets or a combination of assets so as to optimize the proposed application solution.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for interactive training for application providers in a computing environment by a processor, comprising:
    receiving, from a user, natural language input of a problem description or desired functionality of a proposed application solution for a selected application, wherein the natural language input is parsed by a natural language processing (NLP) operation to apportion the natural language input into one or more data chunks each representative of an application requirement;
    determining one or more main functionalities requisite of the proposed application solution by semantically matching the one or more data chunks to the one or more main functionalities required by the proposed application solution to be composed, wherein the one or more data chunks form a data flow of the proposed application solution according to the semantic matching;
    comparing the proposed application solution and one or more optimized solutions to identify one or more differences in the proposed application solution;
    identifying missing assets from the proposed application solution according to the one or more differences, wherein identifying the missing assets includes performing the comparison of the proposed application solution and the one or more optimized solutions to determine that the desired functionality of the selected application would be executed more efficiently by services not input in the proposed application solution yet identified as the missing assets in the one or more optimized solutions, notwithstanding services in the proposed application solution would perform the desired functionality;
    displaying the one or more optimized solutions to the user; and
    surveying the user with a survey relating to the missing assets such that survey results are used to train and develop a level of expertise for the user, wherein the survey is built specifically with respect to the desired functionality of the selected application and the missing assets and provided to the user in natural language to perform the training and the developing of the level of expertise for the user by explaining the displayed one or more optimized solutions.

2. The method of claim 1, further including determining a level of quality of the proposed application solution as compared to the one or more optimized solutions.

3. The method of claim 1, further including initiating an interactive dialog with the user to perform the survey.

4. The method of claim 1, further including providing to the user the survey results that identify one or more assets or a combination of assets so as to optimize the proposed application solution.

5. The method of claim 1, wherein surveying the user further includes determining from the user a level of experience, education, training, expertise, or a combination thereof relating to the missing assets from the proposed application solution.

6. The method of claim 1, further including obtaining the one or more optimized solutions from one or more domain experts, asset or application consultants, a pool of training data, educational data used for one or more applications, application providers, or a combination thereof.

7. A system for interactive training for application providers in a computing environment, comprising:
    one or more computers with executable instructions that when executed cause the system to:
        receive, from a user, natural language input of a problem description or desired functionality of a proposed application solution for a selected application, wherein the natural language input is parsed by a natural language processing (NLP) operation to apportion the natural language input into one or more data chunks each representative of an application requirement;
        determine one or more main functionalities requisite of the proposed application solution by semantically matching the one or more data chunks to the one or more main functionalities required by the proposed application solution to be composed, wherein the one or more data chunks form a data flow of the proposed application solution according to the semantic matching;
        compare the proposed application solution and one or more optimized solutions to identify one or more differences in the proposed application solution;
        identify missing assets from the proposed application solution according to the one or more differences, wherein identifying the missing assets includes performing the comparison of the proposed application solution and the one or more optimized solutions to determine that the desired functionality of the selected application would be executed more efficiently by services not input in the proposed application solution yet identified as the missing assets in the one or more optimized solutions, notwithstanding services in the proposed application solution would perform the desired functionality;

display the one or more optimized solutions to the user; and survey the user with a survey relating to the missing assets such that survey results are used to train and develop a level of expertise for the user, wherein the survey is built specifically with respect to the desired functionality of the selected application and the missing assets and provided to the user in natural language to perform the training and the developing of the level of expertise for the user by explaining the displayed one or more optimized solutions.

8. The system of claim 7, wherein the executable instructions further determine a level of quality of the proposed application solution as compared to the one or more optimized solutions.

9. The system of claim 7, wherein the executable instructions further initiate an interactive dialog with the user to perform the survey.

10. The system of claim 7, wherein the executable instructions further provide to the user the survey results that identify one or more assets or a combination of assets so as to optimize the proposed application solution.

11. The system of claim 7, wherein the executable instructions further determine from the user a level of experience, education, training, expertise, or a combination thereof relating to the missing assets from the proposed application solution.

12. The system of claim 7, wherein the executable instructions further obtain the one or more optimized solutions from one or more domain experts, asset or application consultants, training and educational data used for one or more applications, application providers, or a combination thereof.

13. A computer program product for, by a processor, interactive training for application providers, the computer program product comprising a non-transitory computer-readable storage medium having computer-readable program code portions stored therein, the computer-readable program code portions comprising:

an executable portion that receives, from a user, natural language input of a problem description or desired functionality of a proposed application solution for a selected application, wherein the natural language input is parsed by a natural language processing (NLP) operation to apportion the natural language input into one or more data chunks each representative of an application requirement;

an executable portion that determines one or more main functionalities requisite of the proposed application solution by semantically matching the one or more data chunks to the one or more main functionalities required by the proposed application solution to be composed, wherein the one or more data chunks form a data flow of the proposed application solution according to the semantic matching;

an executable portion that compares the proposed application solution and one or more optimized solutions to identify one or more differences in the proposed application solution;

an executable portion that identifies missing assets from the proposed application solution according to the one or more differences, wherein identifying the missing assets includes performing the comparison of the proposed application solution and the one or more optimized solutions to determine that the desired functionality of the selected application would be executed more efficiently by services not input in the proposed application solution yet identified as the missing assets in the one or more optimized solutions, notwithstanding services in the proposed application solution would perform the desired functionality;

an executable portion that displays the one or more optimized solutions to the user; and an executable portion that surveys the user with a survey relating to the missing assets such that survey results are used to train and develop a level of expertise for the user, wherein the survey is built specifically with respect to the desired functionality of the selected application and the missing assets and provided to the user in natural language to perform the training and the developing of the level of expertise for the user by explaining the displayed one or more optimized solutions.

14. The computer program product of claim 13, further including an executable portion that determines a level of quality of the proposed application solution as compared to the one or more optimized solutions.

15. The computer program product of claim 13, further including an executable portion that initiates an interactive dialog with the user to perform the survey.

16. The computer program product of claim 13, further including an executable portion that provides to the user the survey results that identify one or more assets or a combination of assets so as to optimize the proposed application solution.

17. The computer program product of claim 13, further including an executable portion that determines from the user a level of experience, education, training, expertise, or a combination thereof relating to the missing assets from the proposed application solution.

18. The computer program product of claim 13, further including an executable portion that obtains the one or more optimized solutions from one or more domain experts, asset or application consultants, training and educational data used for one or more applications, application providers, or a combination thereof.

* * * * *